Patented Jan. 12, 1943

2,308,092

UNITED STATES PATENT OFFICE 2,308,092

CERAMIC COMPOSITION AND ARTICLE MADE THEREFROM

Taine G. McDougal and Karl Schwartzwalder, Flint, Mich., assignors to General Motors Corporation, Detroit, Mich., a corporation of Delaware No Drawing. Application June 29, 1939, Serial No. 281,924

9 Claims. (Cl. 106—58)

This invention has to do with ceramic compositions especially adapted for use as electrical insulators such as those employed in spark plugs, and to insulators made of such compositions.

The compositions to which this invention relates are characterized by high beryllium oxide content. It has heretofore been proposed to make spark plug insulators of this oxide. Such insulators have been found to possess good thermal shock resisting qualities, good thermal capacity, good thermal conductivity and good electrical resistance at elevated temperatures. However, beryllium oxide has a melting point of about 2570° C. and a sintering point of about 2000° C. Such temperatures are substantially in excess of those so far used in large production and are difficult and costly to attain even in laboratory installations due to the necessity of employing special fuels and special combustion apparatus and to the inability of commercial refractories to withstand temperatures of this order.

While silica is ordinarily regarded as an undesirable material for use in spark plug insulators—especially insulators subjected to the severe conditions of service existing in most modern types of internal combustion engines, such as high compression aircraft engines—because of the susceptibility of silica containing insulators to breakage as a result of sudden changes in temperature such as are encountered in the operation of such engines, we have found that by the addition of silica in suitable amounts to beryllium oxide excellent insulators may be obtained in which there is no free silica, all of the silica introduced into the raw batch being combined with the beryllia in the firing process to form beryllium silicate. Furthermore bodies of such compositions can be fired to a dense impervious mass at much lower temperatures than beryllia alone. Thus, for example, by the addition of 2½% silica to beryllium oxide the firing temperature is reduced to on the order of 1785° C. as compared with 2000° C. in the case of pure beryllia. With 5% silica, the firing temperature is reduced to 1745° C. and with 10% silica the firing temperature is reduced to 1650° C.

In general we have found that substantial reduction in firing temperature is obtained using as little as 1% silica. We have also found that very good spark plug insulators may be produced from compositions containing as much as 25% silica. Thus while compositions coming within the scope of this invention may fall anywhere within the range of from 1% to 25% silica, with the balance beryllia, we have had best results with compositions containing on the order of from 2% to 5% silica.

By the addition of silica to beryllia it thus becomes possible to produce by commercial methods spark plug insulators composed chiefly of beryllium oxide and possessing in large measure the good physical properties of beryllium oxide, fitting them for the most severe service.

Spark plug insulators made from these new compositions have such greater thermal conductivity that, in measurements in terms of insulation lengths required, they are 6 to 7 insulation lengths better than the best grade of spark plug porcelains now commercially available; that is, an insulator of the new compositions ⁵⁄₃₂ or ₃₂ of an inch longer than the best porcelain insulators will perform as well as such porcelain insulator with respect to conditions under which it will operate without becoming so hot as to cause preignition. The new insulators are superior in this respect to any of the sintered oxide insulators with which we are familiar. They are also substantially free from breakage due to thermal shock and the electrical resistance at high temperatures (Te value) is considerably higher than in insulators now in use. Owing to the high beryllia content the thermal expansion is also greater, an advantage in that it more nearly approximates that of the metal housing in which the insulator is assembled to form the complete compression tight spark plug.

We have also found that the bodies above described may, if desired, be further improved by the addition of magnesium oxide. A combination of magnesia and silica has been found to be more effective than silica alone in lowering the sintering temperature of beryllia batches, thereby making it possible to employ compositions having a greater proportion of beryllia with corresponding improvement in physical properties. We have had success with compositions falling within the following range:

| | Per cent |
|---|---|
| Beryllia (BeO) | 75 to 99 |
| Silica (SiO₂) | 1 to 25 |
| Magnesia (MgO) | 0 to 15 |

The oxides, which should be free from alkalies, may be introduced into the raw batch in the following forms:

Beryllia may be added as the chemically precipitated beryllium oxide, raw or calcined, or as beryllium silicate.

Magnesia is preferably added as such in the form of electric furnace periclase; as magnesite or prepared magnesium carbonate; as natural or prepared hydrated magnesia, preferably calcined to form periclase; or as magnesium silicate.

Silica is preferably added as amorphous silica, quartz, cristobalite, or tridymite; or in a combined form, natural or synthetic, such as beryllium or magnesium silicate.

The raw materials employed should be in a very fine state of subdivision, preferably all the material finer than 43 microns with a greater portion lying between 0 and 5 microns, and should be thoroughly mixed together as by grinding in a ball mill.

Insulator shapes may be made from the raw batch by any desired known method as for example: by casting, by extrusion followed by grinding the dried extruded blank, by dry pressing, or by pressing in rubber molds in accordance with the process described and claimed in Fessler and Russel Patent No. 2,091,973, granted September 7, 1937. However, we prefer to use the process described and claimed in Schwartzwalder Patent No. 2,122,960, granted July 5, 1938. According to this method the inorganic materials are ground with a suitable proportion of temporary organic binder, such as phenolic resin, together with a lubricant. Preferably the finely ground material is then granulated and preformed into predetermined shapes. These shapes are then assembled on a center pin placed in the die and pressed into insulator shapes under heat and heavy pressure. Setting of the binder produces a firm shape readily handled in mass production facilitating the subsequent manufacturing operations. The formed body is fired to a sufficiently high temperature to eliminate the binder and recrystallize the mass into a fine-grained, dense, impervious structure. The bodies will be found to mature at temperatures ranging from Orton Cones 30 to 35, i. e., from 1650° C. to 1785° C. Bodies made of these compositions may be fired in a very short time, e. g., four hours, in suitably designed kilns.

Obviously small proportions of well known ceramic fluxes or of known materials acting as diluents may be employed without departing from the scope of this invention.

We claim:

1. A ceramic composition consisting of a dense, stable non-porous sintered mass showing upon chemical analysis from 1 to 25% silica, from 0 to 15% magnesia, and the balance beryllia.

2. A ceramic composition consisting of a dense, non-porous sintered mass showing upon chemical analysis from 2 to 5% silica, from 0 to 15% magnesia, and the balance beryllia.

3. A spark plug insulator characterized by high thermal conductivity, good resistance to thermal shock, high Te value and high thermal expansion, consisting of a dense, non-porous sintered mass showing upon chemical analysis from 1 to 25% silica, from 0 to 15% magnesia, and the balance beryllia.

4. A spark plug insulator characterized by high thermal conductivity, good resistance to thermal shock, high Te value and high thermal expansion, consisting of a dense, non-porous sintered mass showing upon chemical analysis from 2 to 5% silica, from 0 to 15% magnesia, and the balance beryllia.

5. A spark plug insulator characterized by high thermal conductivity, good resistance to thermal shock, high Te value, and high thermal expansion made by sintering into a dense, non-porous mass a compressed finely ground mixture of from 1 to 25% silica, from an appreciable quantity to 15% magnesia, and the balance beryllia.

6. A spark plug insulator characterized by high thermal conductivity, good resistance to thermal shock, high Te value and high thermal expansion made by sintering into a dense, non-porous mass a compressed finely ground mixture of from 2 to 5% silica, from an appreciable quantity to 15% magnesia, and the balance beryllia.

7. A spark plug insulator characterized by high thermal conductivity, good resistance to heat shock, high Te value and high thermal expansion, in the form of a dense, non-porous body consisting of beryllium silicate intimately associated with a preponderance of beryllium oxide.

8. The method of making a ceramic body characterized by high thermal conductivity, good resistance to thermal shock, high Te value and high thermal expansion which consists in sintering into a dense, non-porous mass a compressed finely ground mixture of from 1 to 25% silica, from 0 to 15% magnesia and the balance beryllia.

9. The method of making a ceramic body characterized by high thermal conductivity, good resistance to thermal shock, high Te value and high thermal expansion which consists in sintering into a dense, non-porous mass a compressed finely ground mixture of from 2 to 5% silica, from 0 to 15% magnesia and the balance beryllia.

TAINE G. McDOUGAL.
KARL SCHWARTZWALDER.